(12) United States Patent
White

(10) Patent No.: US 10,183,877 B2
(45) Date of Patent: Jan. 22, 2019

(54) SEWAGE TREATMENT CHLORINATOR AND SYSTEM AND METHOD FOR USE OF SAME

(71) Applicant: J. C. White, Emory, TX (US)

(72) Inventor: J. C. White, Emory, TX (US)

( * ) Notice: Subject to any disclaimer, the term of this patent is extended or adjusted under 35 U.S.C. 154(b) by 52 days.

(21) Appl. No.: 15/602,954

(22) Filed: May 23, 2017

(65) Prior Publication Data

US 2017/0341962 A1 Nov. 30, 2017

Related U.S. Application Data

(60) Provisional application No. 62/342,271, filed on May 27, 2016.

(51) Int. Cl.
| | | |
|---|---|---|
| *B01F 1/00* | (2006.01) | |
| *C02F 1/68* | (2006.01) | |
| *C02F 1/76* | (2006.01) | |
| *C02F 3/30* | (2006.01) | |

(52) U.S. Cl.
CPC ............ *C02F 1/688* (2013.01); *B01F 1/0027* (2013.01); *C02F 1/76* (2013.01); *C02F 3/30* (2013.01); *B01F 2001/0061* (2013.01); *C02F 2303/04* (2013.01)

(58) Field of Classification Search
CPC .................. B01F 1/0027; B01F 1/0033; B01F 2001/0055; B01F 2001/0061; C02F 1/687; C02F 1/688; C02F 1/76; C02F 3/30; C02F 2303/04
See application file for complete search history.

(56) References Cited

U.S. PATENT DOCUMENTS

| | | |
|---|---|---|
| 1,715,466 A | 6/1929 | Miller |
| 3,415,378 A | 12/1968 | Fukuda |
| 3,681,236 A | 8/1972 | Bergles |
| 3,741,393 A | 6/1973 | Estes et al. |
| 4,268,389 A | 5/1981 | Rapp et al. |
| 4,325,823 A | 4/1982 | Graham |
| 4,608,157 A | 8/1986 | Graves |
| 4,650,577 A | 3/1987 | Hansel |
| 4,933,076 A | 6/1990 | Oshima et al. |
| 5,104,542 A | 4/1992 | Dixon et al. |
| 5,221,470 A | 6/1993 | McKinney |
| 5,490,935 A | 2/1996 | Guy |
| 5,492,635 A | 2/1996 | Ball |
| 5,549,818 A | 8/1996 | McGrew, Jr. |
| 5,667,689 A | 9/1997 | Graves |

(Continued)

*Primary Examiner* — Lucas A Stelling

(74) *Attorney, Agent, or Firm* — Scott T. Griggs; Griggs Bergen LLP

(57) ABSTRACT

A sewage treatment chlorinator for use at a site not connected to a municipal sewer system and system and method for use of the same are disclosed. In one embodiment of the sewage treatment chlorinator, a housing includes an external conduit coupled in a t-connection to a flow tube. An inner canister is sized to be selectively inserted and removed from the external conduit and includes a perforated end cap having a flow deck sized to suspend a chlorine tablet within a contact chamber of the flow tube. The flow tube receives effluent form an aerobic tank and discharge treated effluent to a post-treatment tank. At least a portion of the discharge from the flow tube is gravity-based discharge into the post-treatment tank.

10 Claims, 2 Drawing Sheets

(56) References Cited

U.S. PATENT DOCUMENTS

| | | | |
|---|---|---|---|
| 5,879,550 A | 3/1999 | Cox | |
| 6,183,630 B1 * | 2/2001 | Reeves | C02F 1/688 |
| | | | 137/268 |
| 6,224,752 B1 | 5/2001 | Drewery | |
| 6,228,258 B1 | 5/2001 | Donald et al. | |
| 6,406,619 B1 | 6/2002 | Donald et al. | |

* cited by examiner

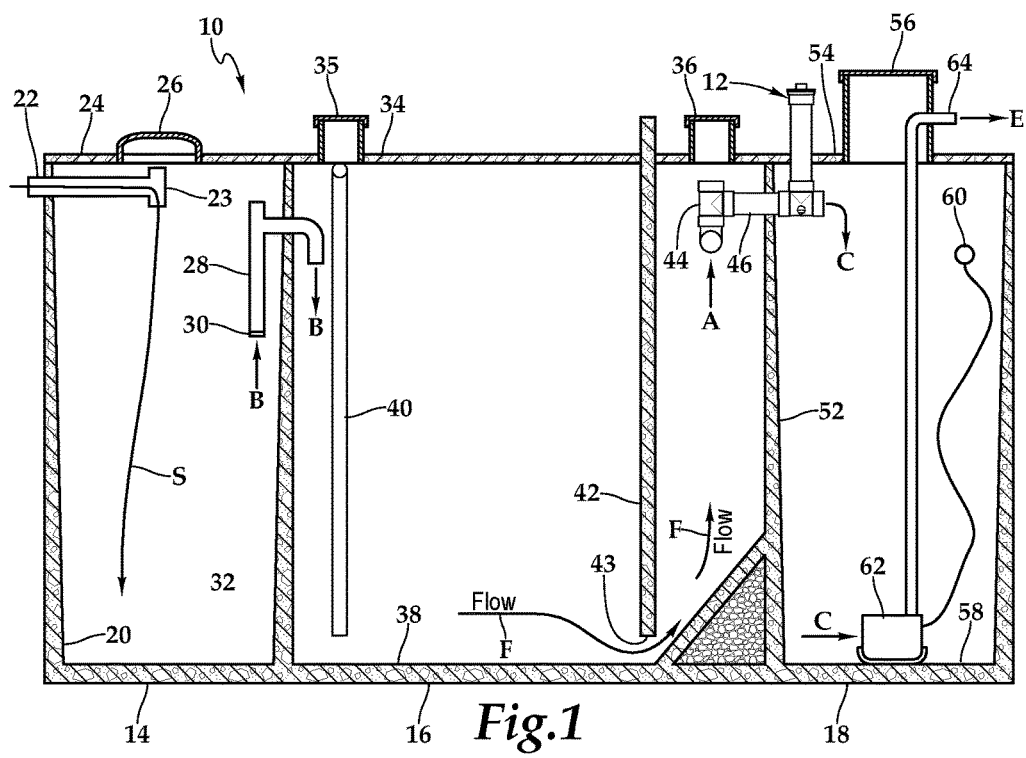
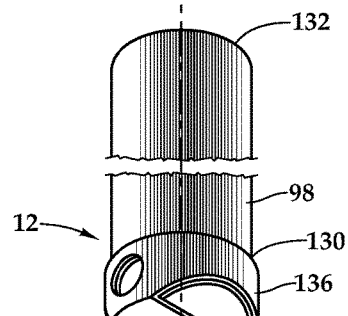
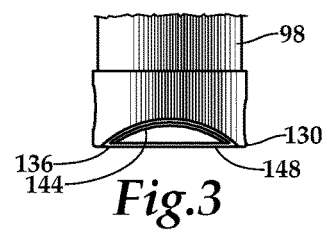
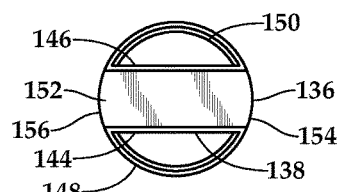
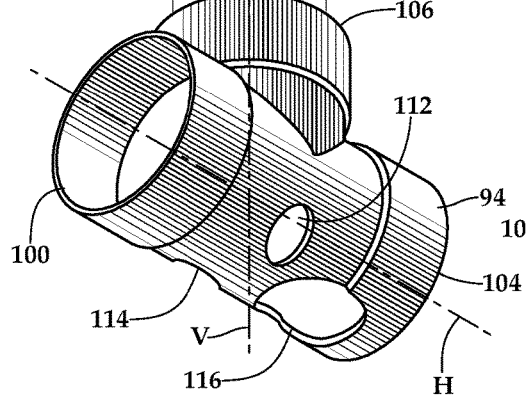

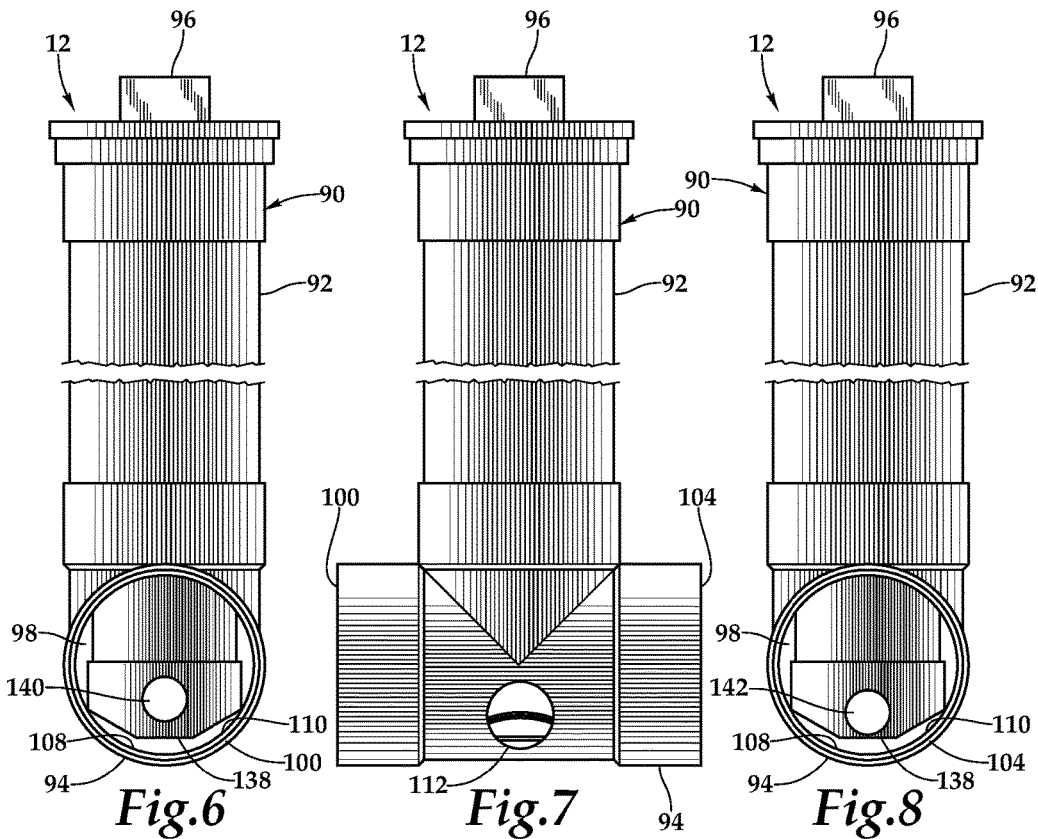
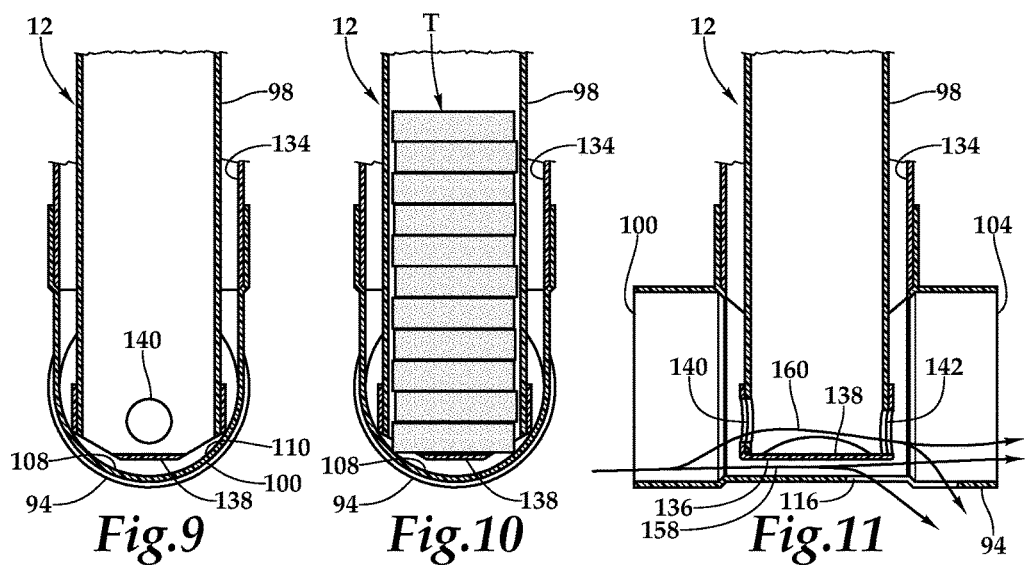

SEWAGE TREATMENT CHLORINATOR AND SYSTEM AND METHOD FOR USE OF SAME

PRIORITY STATEMENT & CROSS-REFERENCE TO RELATED APPLICATIONS

This application claims priority from U.S. Application Ser. No. 62/342,271, entitled "Sewage Treatment Chlorinator and System and Method for Use of Same" and filed on May 27, 2016, in the name of J. C. White; which is hereby incorporated by reference for all purposes.

TECHNICAL FIELD OF THE INVENTION

This invention relates, in general, to the treatment of sewage or waste water and, in particular, to a sewage treatment chlorinator and system and method for use of the same where a house or other building is not connected to a municipal sewer system.

BACKGROUND OF THE INVENTION

Sewage treatment is the process of removing contaminants from wastewater, primarily from household or other building sewage. It includes physical, chemical, and biological processes to remove these contaminants and produce environmentally safe treated wastewater or treated effluent, which may be safely discharged into the environment. Continued improvements are warranted for cleaner effluent discharge from sewage treatment systems that require decreased maintenance and increased ease-of-use. Accordingly, there is a need for a sewage treatment chlorinator and system and method for use of the same for a house or other building that is not connected to a municipal sewer system.

SUMMARY OF THE INVENTION

It would be advantageous to provide cleaner effluent discharge from sewage treatment systems. It would also be desirable to enable a mechanical-based solution that is easily and quickly deployed without the need for a complex maintenance or labor. To better address one or more of these concerns, a sewage treatment chlorinator and system and method for use of the same are disclosed for a house or other building that is not connected to a municipal sewer system. In one embodiment of the sewage treatment chlorinator, a housing includes an external conduit coupled in a t-connection to a flow tube. An inner canister is sized to be selectively inserted and removed from the external conduit and includes a perforated end cap having a flow deck sized to suspend a chlorine tablet within a contact chamber of the flow tube. The flow tube receives effluent from an aerobic tank and discharge treated effluent to a post-treatment tank. At least a portion of the discharge from the flow tube is gravity-based discharge into the post-treatment tank. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic side view depicting one embodiment of the sewage treatment system utilizing a sewage treatment chlorinator, according to the teachings presented herein;

FIG. 2 is a front perspective exploded view of internal components of the sewage treatment chlorinator depicted in FIG. 1;

FIG. 3 is a side elevation view of one embodiment of an inner canister, which forms a portion of the sewage treatment chlorinator depicted in FIG. 1;

FIG. 4 is a bottom plan view of the inner canister;

FIG. 5 is a bottom plan view of the sewage treatment chlorinator;

FIG. 6 is a side intake-facing view of the sewage treatment chlorinator;

FIG. 7 is a front elevation view of the sewage treatment chlorinator;

FIG. 8 is a side discharging-facing view of the sewage treatment chlorinator;

FIG. 9 is a side intake-facing cross-sectional view of the sewage treatment chlorinator, without a chlorine tablet;

FIG. 10 is a side discharging-facing cross-sectional view of the sewage treatment chlorinator, with a chlorine tablet therein; and FIG. 11 is a front cross-sectional view of the sewage treatment chlorinator, without a chlorine tablet.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a three stage sewage treatment plant 10 utilizing a sewage treatment chlorinator 12. The three stage sewage treatment plant 10 may be on-site and associated with a house or other building that is not connected to a municipal sewer system, for example. As shown, the three stage sewage treatment plant 10 utilizes a three stage process for treating sewage, which includes a pretreatment tank 14, an aerobic tank 16, and a post-treatment tank 18. The pretreatment tank 14 holds the sewage for a period of time to allow anaerobic microorganisms in the sewage to begin initial breakdown of the sewage. The aerobic tank 16 aerates the sewage to allow aerobic microorganisms to further break down the sewage such that the sewage is clarified as heavier particles separate from the effluent. The post-treatment tank 18 chlorinates the effluent before discharge.

In one embodiment, raw sewage S enters the pretreatment tank 14 through sidewall 20 at an inlet port 22, which is located near the top of the pretreatment tank 14 and away from the aerobic tank 16. An inlet baffle 23 provides fluid communication from the inlet port 22 to the interior of the pretreatment tank 14. The pretreatment tank also includes a cover 24 having a hatch 26 providing access thereto. An overflow conduit 28 is located near the top of the pretreatment tank 14 away from the inlet port 22 and adjacent to the aerobic tank 16 as the overflow conduit 28 penetrates the sidewall 20 of the pretreatment tank 14 and enters the aerobic tank 16. The overflow conduit 28 transports sewage B, which has begun to break down, from the pretreatment tank 14 to the aerobic tank 16 after the sewage has been in the pretreatment tank 14 for a sufficient duration of time to allow anaerobic microorganisms to being processing the sewage. The overflow conduit 28 draws effluent A from beneath the surface, in a relatively particle-free zone of effluent between the surface, where light particles float, and the bottom, where the heavy particles settle. As shown, a filter 30 is positioned on the overflow conduit to reduce the amount of solid contaminants exiting the pretreatment tank 14 and entering the aerobic tank 16.

The aerobic tank 16 includes a sidewall 32 and a cover 34 having inspection risers 35, 36 therethrough, each of which may be positioned above ground to facilitate careful or critical viewing of the sewage treatment plant 10. Within a chamber 38 of the aerobic tank 16, a dropline 40, which may be a conduit, is generally capped at the bottom end with holes for emitting air bubbles. The dropline 40 may extend vertically downward from the inspection riser 35. Optionally, an air feed conduit may be included and lead to an external air compressor. It should be appreciated that although one dropline feed is depicted, more droplines and air feed conduits may be utilized as part of the invention. The dropline or droplines are typically distributed in the chamber such that they provide for aeration throughout the upper part of the chamber to ensure that there are no dead zones. The top end of these droplines may be connected to an air feed conduit which directs air from the compressor, so that the dropline or droplines will emit air bubbles into the chamber, continuously aerating the sewage passing through the chamber of the aerobic tank.

In one embodiment, near the center of the chamber 38, a wall 42, which may be concrete, extends vertically downward from the cover 34. An opening 43 provides for fluid flow between the wall 42 and the bottom surface of the chamber 38. A baffle 44 is located to draw cleaned effluent from near the top of the sewage surface level within the aerobic tank and transport the cleaned effluent along outlet conduit to the sewage treatment chlorinator, which is located within the post-treatment tank 18 proximate to the aerobic tank. More particularly, the sewage B, which has already been initially processed by anaerobic microorganisms, enters the aerobic tank 16 through the overflow conduit 28 located near the top of the aerobic tank 16. The sewage B moves into the chamber 38 of the aerobic tank 16 and descends downward through the chamber as additional sewage B enters the aerobic tank 16 through the overflow conduit 28. As the sewage B descends, it passes through the air bubbles emitted from the droplines. This excites the sewage B, causing turbulent motion, as it aerates the sewage. Injecting air into the sewage activates and stimulates the aerobic microorganisms in the sewage. This causes the aerobic microorganisms to multiply and increases the amount of sewage that they digest. This aerobic process eliminates sewage contaminants to a great extent, cleaning the sewage. After passing through the aeration zone of the chamber 38 of the aeration tank 16, the sewage enters a relatively calm zone below the air holes in the drop lines. Here, settling begins to occur, with heavier solids falling towards the bottom of the aerobic tank. This continuous process results in a very clean effluent at the top of the chamber, where effluent flow F travels under the wall 42 at the opening 43 and the clean effluent A is drained off by the baffle 44 and flows out of the aerobic tank 16 through the outlet conduit 46 and into the post-treatment tank 18.

The post-treatment tank 18 includes a sidewall 52 having a cover 54 thereon, with a pump extension riser 56 extending from the cover 54. The outlet conduit 46 traverses the sidewall 32 of the aerobic tank 16 and the sidewall 52 of the post-treatment tank 18. The outlet conduit 46 is rigidly attached to the sewage treatment chlorinator 12, which distributes chlorine into the effluent. Treated effluent C passing through the sewage treatment chlorinator 12 is stored in a chamber 58 of the post-treatment tank 14 until, in one embodiment, the level of effluent rises high enough to activate a float switch 60, which is connected to an internal pump 62. Upon activation of the float switch 60, the internal pump 62 pumps the treated effluent C out of the post-treatment tank 18 through an outlet port 64, discharging the now clean effluent E into the environment.

The three tanks, the pretreatment tank 14, the aerobic tank 16, and the post-treatment tank 18, may be integrally formed and manufactured from wire reinforced concrete. The covers 24, 34, 54 may also be integrally formed and manufactured from wire reinforced concrete. It should be appreciated, however, that any material selection that is strong, durable, and relatively inexpensive is acceptable. The various pipes, conduits, and joints may be made of any non-porous, non-toxic solid material, but the preferred embodiment uses commercially available PVC components. In addition, since each tank needs to be sealed to prevent transfer of liquids or gases therebetween and to prevent leakage of untreated sewage out of the sewage treatment plant, sealant material is used wherever a conduit, pipe, or port passes through a separating wall. Generally, the tanks are sized appropriately depending on the expected sewage production rate of the buildings serviced by the sewage treatment plant, with the size of the aerobic tank being most critical to the sewage cleaning process since the aerobic microorganisms must be given sufficient time to process the sewage. In one embodiment, the aerobic tank holds approximately 1006 gallons, while the pretreatment tank holds approximately 400 gallons and the post-treatment tank holds approximately 750 gallons.

It should be appreciated that although a sewage treatment plant 10 with three tanks, a pretreatment tank 14, an aerobic tank 16, and a post-treatment tank 18, is illustrated, other designs and arrangements of sewage treatment plants are within the teachings presented herein. The exact number of tanks and other criteria of the sewage treatment plant will depend on a number of factors, including sewage load and desired flow rate.

Referring now to FIG. 2 through FIG. 11, one embodiment of a sewage treatment chlorinator 12 for use at a site not connected to a municipal sewer system is illustrated. A housing 90 includes an external conduit 92 coupled to a flow tube 94 and, as shown, the external conduit 92 forms a t-connection with the flow tube 94. An access cap 96 located on the external conduit 92 opposite the t-connection is selectively removable from the external conduit 92 in order to provide access to an inner canister 98. The flow tube 94 has a pre-chlorination inlet port 100 and multiple post-chlorination discharge ports, which are collectively designated 102 and include discharge port 104. The flow tube 94 may include an opening 106 sized to accept the inner canister. The flow tube also may have a chamber wall 108 defining a contact chamber 110 intersecting the pre-chlorination inlet port 100, at least one of the post-chlorination discharge ports 102, and the opening 106.

More particularly, the flow tube 94 may include a vertical axis V and a horizontal axis H perpendicular thereto. An exit hole 112 may be located in the chamber wall 108 opposite the opening 106 at approximately 60 degrees from the vertical axis V. Another exit hole 114 may be located in the chamber wall 108 opposite the opening 106 at approximately 60 degrees from the vertical axis V such that the exit hole 112 and the exit hole 114 are approximately 120 degrees spaced. A third exit hole 116 may be located proximate to the discharge port 104 and the exits holes 112, 114. In the illustrated embodiment, the exit hole 116 is approximately 90 degrees offset relative to the discharge port 104. Further, in the illustrated embodiment, the exit holes 112, 114, 116 provide gravity-based discharge of effluent and the surface area of the exit holes 112, 114, 116 is at least approximate to or greater than the surface area of the pre-chlorination inlet port 100 to prevent blockages and standing effluent.

As previously alluded, the sewage treatment chlorinator 12 is positioned between the aeration tank 16 and the post-treatment tank 18. In this application, the pre-chlorination inlet port 100 is configured to receive effluent A from the aerobic tank 16 and the multiple post-chlorination discharge ports 102 are configured to discharge treated effluent to the post-treatment tank 18. In one implementation, at least one of the post-chlorination discharge ports 102 provides gravity-based discharge of the treated effluent to the post-treatment tank 18.

The inner canister 98 includes ends 130, 132 and, as shown, the end 130 of the inner canister is sized to be selectively inserted and removed from the external conduit 92. An annulus 134 is formed between the inner canister 98 and the external conduit 92 upon insertion therein. A perforated end cap 136 is secured to the end of the inner canister 98 and the perforated end cap 136 includes a flow deck 138 sized to suspend a chemical tablet T, such as chlorine tablets above the chamber wall 108 within the contact chamber 110 of the flow tube 94. The flow deck 138 is sized and positioned to accommodate multiple chemical tablets T within the contact chamber 110. The perforated end cap 136 includes multiple holes providing fluid communication between the contact chamber 110 and the flow deck 138. The holes of the perforated end cap 136 may include orifices 140, 142 penetrating the perforated end cap 136 and the inner canister 98 proximate to the end 130 of the inner canister 98. The orifices 140, 142 may be located in an opposing relationship and the orifices 140, 142 are aligned with the flow deck 138. Orifices 144, 146 are located at the end 130 of the inner canister 98 such that the orifices 144, 146 straddle the flow deck 138. The orifices 144, 146 also form respective beveled edges 148, 150 at the first end 130 of the inner canister.

The perforated end cap 136 has an edge 152 including multiple contact surfaces 148, 150 and multiple non-contact surfaces represented by the beveled edges 154, 156. In the inserted, operational position, the contact surfaces 148, 150 of the perforated end cap 136 contact the chamber wall 108 such that a lower fluid communication pathway is created between the chamber wall 108 and the perforated end cap 136 and an upper fluid communication pathway 160 is created superjacent to the perforated end cap 136. As illustrated, the lower fluid communication pathway 158 and the upper fluid communication pathway 160 are vertically separated by the flow deck 138.

In operation, influent A enters the sewage treatment chlorinator from the aerobic tank 16 or other residential wastewater treatment unit and flows into the pre-chlorination inlet port 100 of the flow tube 94. The influent then proceeds to the flow deck 138 within the contact chamber 110, where the chemical tablets T are contained within the inner canister 98. As mentioned, the flow deck 138 is sized and positioned to accommodate multiple chemical tablets T within the contact chamber 110. Active chemicals from the chemical tablets T are released into the fluid communication pathways 158, 160 as the influent erodes the chemical tablets T. As the incoming flow rate increases of influent, the liquid level in the contact chamber 110 and inner canister 98 rises. The increase in liquid level causes the influent flow to contact more chemical tablets T and provides for additional chemical releases required for treatment. Conversely, as the flow rate decreases, the liquid level results in fewer chemical tablets being contacted and the chemical dosage is reduced. After contact with the chemical tablets T, properly chlorinated effluent exits the sewage treatment chlorinator through a post-chlorination discharge port 102. As shown, in one embodiment, multiple post-chlorination discharge ports 102, including discharge port 104, exit hole 112, exit hole 114, and exit hole 116, employ gravity to assist in the evacuation of the sewage treatment chlorinator. This prevents influent from standing in contact with the chemical tablets T and also prevents crystallization and other blockage problems that may potentially cause a backflow or other failure. Once the chemical tablets T are depleted or during regular maintenance, the inner canister 98 may be removed by unscrewing the access cap 96 and fresh chemical tablets T loaded into the flow deck 138 of the inner canister 98.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A sewage treatment chlorinator comprising:
   a housing having an external conduit coupled to a flow tube, the external conduit forming a t-connection with the flow tube;
   the flow tube including a pre-chlorination inlet port and a post-chlorination discharge port, the flow tube including an opening sized to accept an inner canister, the flow tube having a chamber wall defining a contact chamber intersecting the pre-chlorination inlet port, the post-chlorination discharge port, and the opening;
   the inner canister having a first end and a second end, the first end of the inner canister being sized to be selectively inserted and removed from the external conduit, an annulus being formed between the inner canister and external conduit upon insertion therein;
   a perforated end cap secured to the first end of the inner canister, the perforated end cap including a flow deck sized to suspend a chlorine tablet above the chamber wall within the contact chamber of the flow tube;
   the perforated end cap including a plurality of holes providing fluid communication between the contact chamber and the flow deck;
   the perforated end cap having an edge including plurality of contact surfaces and a plurality of non-contact surfaces; and
   in the inserted, operational position, the plurality of contact surfaces of the perforated end cap contacting the chamber wall such that a lower fluid communication pathway is created between the chamber wall and the end cap and an upper fluid communication pathway is created superjacent to the end cap, the first fluid communication pathway and the second fluid communication pathway being vertically separated by the flow deck.

2. The sewage treatment chlorinator as recited in claim 1, wherein the housing further comprises an access cap located on the external conduit opposite the t-connection, the access cap being selectively removable from the external conduit in order to provide access to the inner canister.

3. The sewage treatment chlorinator as recited in claim 1, wherein the flow tube further comprises:
   a vertical axis and a horizontal axis perpendicular thereto;
   a first exit hole located in the chamber wall opposite the opening at approximately 60 degrees from the vertical axis;
   a second exit hole located in the chamber wall opposite the opening at approximately 60 degrees from the vertical axis, the first exit hole and the second exit hole being approximately 120 degrees spaced; and
   a third exit hole proximate the post-discharge port and first and second exits holes, the third exit hole being approximately 90 degrees offset relative to the post-discharge port.

4. The sewage treatment chlorinator as recited in claim 3, wherein the first, second, and third exit holes provide gravity-based discharge of effluent.

5. The sewage treatment chlorinator as recited in claim 3, wherein the surface area of the first, second, and third exit holes at least approximates the surface area of the pre-chlorination inlet port.

6. The sewage treatment chlorinator as recited in claim 1, wherein the plurality of holes of the perforated end cap further comprise:
   first and second orifices penetrating the perforated end cap and the inner canister proximate to the first end of the inner canister, the first and second orifices located in an opposing relationship, the first and second orifices aligning with the flow deck; and
   third and fourth orifices at the first end of the inner canister, the third and fourth orifices straddling the flow deck, the third and fourth orifices forming respective first and second beveled edges at the first end of the inner canister.

7. A sewage treatment chlorinator for use at a site not connected to a municipal sewer system, the sewage treatment chlorinator comprising:
   a housing having an external conduit coupled to a flow tube, the external conduit forming a t-connection with the flow tube;
   the flow tube including a pre-chlorination inlet port and a plurality of post-chlorination discharge ports, the flow tube including an opening sized to accept an inner canister, the flow tube having a chamber wall defining a contact chamber intersecting the pre-chlorination inlet port, at least one of the post-chlorination discharge ports, and the opening;
   the pre-chlorination inlet port being configured to receive effluent from an aerobic tank;
   the plurality of post-chlorination discharge ports being configured to discharge treated effluent to a post-treatment tank;
   at least one of the post-chlorination discharge ports providing gravity-based discharge of the treated effluent to the post-treatment tank;
   the inner canister having a first end and a second end, the first end of the inner canister being sized to be selectively inserted and removed from the external conduit, an annulus being formed between the inner canister and external conduit upon insertion therein;
   a perforated end cap secured to the first end of the inner canister, the perforated end cap including a flow deck sized to suspend a chlorine tablet above the chamber wall within the contact chamber of the flow tube;
   the perforated end cap including a plurality of holes providing fluid communication between the contact chamber and the flow deck;
   the perforated end cap having an edge including plurality of contact surfaces and a plurality of non-contact surfaces; and
   in the inserted, operational position, the plurality of contact surfaces of the perforated end cap contacting the chamber wall such that a lower fluid communication pathway is created between the chamber wall and the end cap and an upper fluid communication pathway is created superjacent to the end cap, the first fluid communication pathway and the second fluid communication pathway being vertically separated by the flow deck.

8. The sewage treatment chlorinator as recited in claim 7, wherein the flow tube further comprises:
   a vertical axis and a horizontal axis perpendicular thereto;
   a first exit hole located in the chamber wall opposite the opening at approximately 60 degrees from the vertical axis;
   a second exit hole located in the chamber wall opposite the opening at approximately 60 degrees from the vertical axis, the first exit hole and the second exit hole being approximately 120 degrees spaced; and
   a third exit hole proximate the post-discharge port and first and second exits holes, the third exit hole being approximately 90 degrees offset relative to the post-discharge port,
   wherein the first, second, and third exit holes form a portion of the plurality of post-chlorination discharge ports.

9. The sewage treatment chlorinator as recited in claim 8, wherein the surface area of the first, second, and third exit holes at least approximates the surface area of the pre-chlorination inlet port.

10. A sewage treatment chlorinator for use at a site not connected to a municipal sewer system, the sewage treatment chlorinator comprising:
   a housing having an external conduit coupled to a flow tube, the external conduit forming a t-connection with the flow tube;
   the flow tube including a pre-chlorination inlet port and a plurality of post-chlorination discharge ports, the flow tube including an opening sized to accept an inner canister, the flow tube having a chamber wall defining a contact chamber intersecting the pre-chlorination inlet port, at least one of the post-chlorination discharge ports, and the opening;
   the pre-chlorination inlet port being configured to receive effluent from an aerobic tank;
   the plurality of post-chlorination discharge ports being configured to discharge treated effluent to a post-treatment tank;
   at least one of the post-chlorination discharge ports providing gravity-based discharge of the treated effluent to the post-treatment tank;

the inner canister having a first end and a second end, the first end of the inner canister being sized to be selectively inserted and removed from the external conduit, an annulus being formed between the inner canister and external conduit upon insertion therein;

a perforated end cap secured to the first end of the inner canister, the perforated end cap including a flow deck sized to suspend a chlorine tablet above the chamber wall within the contact chamber of the flow tube;

the perforated end cap including a plurality of holes providing fluid communication between the contact chamber and the flow deck;

the perforated end cap having an edge including plurality of contact surfaces and a plurality of non-contact surfaces;

in the inserted, operational position, the plurality of contact surfaces of the perforated end cap contacting the chamber wall such that a lower fluid communication pathway is created between the chamber wall and the end cap and an upper fluid communication pathway is created superjacent to the end cap, the first fluid communication pathway and the second fluid communication pathway being vertically separated by the flow deck; and the flow tube includes:

a vertical axis and a horizontal axis perpendicular thereto, a first exit hole located in the chamber wall opposite the opening at approximately 60 degrees from the vertical axis, a second exit hole located in the chamber wall opposite the opening at approximately 60 degrees from the vertical axis, the first exit hole and the second exit hole being approximately 120 degrees spaced, and a third exit hole proximate the post-discharge port and first and second exits holes, the third exit hole being approximately 90 degrees offset relative to the post-discharge port, wherein the first, second, and third exit holes form a portion of the plurality of post-chlorination discharge ports, wherein the surface area of the first, second, and third exit holes at least approximates the surface area of the pre-chlorination inlet port.

\* \* \* \* \*